(12) United States Patent
Leone (10) Patent No.: US 6,391,359 B2
(45) Date of Patent: May 21, 2002

(54) METHOD AND PRODUCT FOR DECAFFEINATING AN AQUEOUS SOLUTION USING MOLECULARLY IMPRINTED POLYMERS

(76) Inventor: Anna Madeleine Leone, P.O. Box 8626, Emeryville, CA (US) 94662

( * ) Notice: Subject to any disclaimer, the term of this patent is extended or adjusted under 35 U.S.C. 154(b) by 0 days.

(21) Appl. No.: 09/969,427

(22) Filed: Oct. 1, 2001

Related U.S. Application Data

(62) Division of application No. 09/408,486, filed on Sep. 28, 1999, now Pat. No. 6,322,834.

(51) Int. Cl.[7] ............................................. A23F 3/20
(52) U.S. Cl. .................. 426/422; 426/597; 426/424; 426/435
(58) Field of Search .................. 426/422, 597, 426/424, 435

(56) References Cited

U.S. PATENT DOCUMENTS 5,587,273 A * 12/1996 Yan et al.
5,872,198 A * 2/1999 Mosbach et al.
5,942,444 A * 8/1999 Rittenburg et al.
6,165,519 A * 12/2000 Lehrer et al.
6,322,834 B1 * 11/2001 Leone

* cited by examiner

Primary Examiner—Anthony J Weier
(74) Attorney, Agent, or Firm—Risto A. Rinne, Jr.

(57) ABSTRACT

A method and product for decaffeinating an aqueous solution, such as a cup of coffee or tea, includes exposing the aqueous solution (that is to be decaffeinated) to a plurality of molecularly imprinted polymer beads (MIPS) that have receptor sites on the surfaces thereof that include imprints that match the physical shape of at least a portion of a caffeine molecule. A quantity of the caffeine molecules align with and adhere to some of the receptor sites and, accordingly, they are removed from the aqueous solution producing a decaffeinated aqueous solution. The MIPS are contained in an enclosure having a plurality of openings large enough to permit the aqueous solution to pass through and small enough so as to prevent the MIPS from passing through. Accordingly, the MIPS are absent from the decaffeinated aqueous solution. A variety of ways of affecting the efficacy of the process are described, such as varying the time the aqueous solution is exposed to the MIPS or varying the quantity of MIPS (beads) that the aqueous solution is exposed to. Processes useful for creating the MIPS and of removing the caffeine molecules therefrom (i.e., cleaning the MIPS so that they are suitable to use in decaffeinating the aqueous solution) are described. The cleaning and subsequent reuse of the MIPS is also described.

10 Claims, 3 Drawing Sheets

METHOD AND PRODUCT FOR DECAFFEINATING AN AQUEOUS SOLUTION USING MOLECULARLY IMPRINTED POLYMERS

This application is a divisional of application Ser. No. 09/408,486, filed Sep. 28, 1999, now U.S. Pat. No. 6,322,834.

BACKGROUND OF THE INVENTION

1. Field of the Invention

The present invention, in general relates to removing caffeine from a foodstuff and, more particularly, to a method for removing a portion of the caffeine from an aqueous solution, such as an extract of a vegetable material, for example; a coffee or a tea, by exposure of the aqueous solution to a molecularly imprinted polymer.

The deleterious effects of excessive caffeine consumption are only partially understood at present. However, what is known is sufficient to generally determine and conclude that caffeine is potentially detrimental when consumed in excess.

For certain individuals, even a small intake of caffeine increases certain health risks and they, therefore, are required to either limit or in some circumstances, entirely eliminate their intake of caffeine.

Methods for decaffeinating foodstuffs are generally well known. For example, decaffeinated coffees have long been on the market. However, there are a few significant problems inherent with currently known decaffeination processes.

First, the majority of these processes use toxic organic solvents as part of the decaffeination process. This is a fact not generally well advertised for obvious reasons. If it were well known, confidence in the use of such decaffeinated products would decline and their consumption would similarly decline.

This is because most people who consume decaffeinated foodstuffs and beverages in particular, do so for health-conscious reasons. The possibility that they may instead be consuming unknown amounts of other potentially harmful substances that are used in, or are a product of the decaffeination process, is not likely to well received by such health-conscious individuals.

Also, the efficacy of current decaffeination methods varies considerably with the method. While some are capable of removing substantial percentages of caffeine, other methods are not as effective.

Those methods that are effective tend to be broad based in their approach, removing a wide variety of organic compounds not intended to be removed from the foodstuff. This can have a deleterious effect upon the taste of the foodstuff by removing organic compounds that normally give the foodstuff its unique character and flavor.

Another well known problem inherent, as was briefly mentioned hereinabove with certain decaffeination processes, is that they may affect the taste of the foodstuff. While some gains have recently been made in this regard, most consumers feel that decaffeinated products taste worse, perhaps even far worse, than their caffeine containing counterparts. This problem is so acute that many consumers who are advised to drink decaffeinated coffee, for example, quit drinking coffee entirely rather than endure a taste which they feel is vastly inferior to that which they have previously experienced.

One of the reasons for this is that the chemicals used to decaffeinate the foodstuff may themselves have a taste of their own that lingers in various amounts thereby coloring the taste of the decaffeinated product. This is confirmed by many consumers who state that decaffeinated coffee, for example, has a "chemical taste" that is unappealing.

And as mentioned hereinabove, the non-specific removal of organic compounds from the foodstuff also tends to remove certain of the ingredients that provide it with a delicate or otherwise characteristic flavor. Therefore, after decaffeination has occurred, the taste appeal may no longer remain. Consequently, market share will inevitably be less with a poor tasting decaffeinated foodstuff, in particular with a coffee or tea, that it would if the taste were minimally affected or better yet, unaffected except for that caused directly by the removal of the caffeine.

Another concern is cost. Decaffeinated products can cost more than untreated products. This is due to the time and labor involved in the decaffeination process as well as to the cost of materials used, such as chemicals. It is, of course, desirable to lessen the cost to decaffeinate a product, thereby making it more affordable for the general public to consume.

There is another disadvantage that the consumer of decaffeinated beverages faces and that is limited range of selection. For example, a coffee drinker who does not restrict his or her caffeine intake may purchase a great many varieties of coffee beans or various combination blends of these beans at most coffee roasting houses. However, if he or she wishes to consume a decaffeinated coffee, only a very few selections are likely to be available.

Furthermore, the use of organic solvents to decaffeinate coffees and teas pose environmental hazards as well. A very large quantity of organic solvents are presently being used for decaffeination purposes. These organic solvents are pollutants that can adversely affect the aquifer or otherwise contaminate the ground, either as waste products or if carelessly handled. They also pose a substantial risk to employees.

Also, some of the other processes presently used to decaffeinate vegetable materials expend considerable quantities of energy as the vegetable materials are repeatedly exposed to steam, For example.

While the deleterious environmental impacts from organic solvents and energy consumption may, at first seem insignificant, they are substantial once the true magnitude is understood. The quantity is so large that, literally, mountains of coffees are decaffeinated annually and the quantities of organic solvents that are used and eventually released into the environment as pollutants are enormous as is the energy that is consumed. Therefore, from the environmental perspective a process for decaffeinating aqueous solutions that conserves energy and substantially lessens the use of organic solvents is desirable.

Accordingly, there exists today a need for a method and product for decaffeinating an aqueous solution, such as an extract of a vegetable foodstuff that is safe to use, does not introduce new and potentially unpleasant tastes, can be used with a variety of beverages that contain caffeine, and is effective. Clearly, such a method would be useful and especially desirable.

2. Description of Prior Art

Decaffeination methods and devices for decaffeinating coffee are, in general, known. For example, the following patents describe various types of these devices:

U.S. Pat. No. 4,465,699 to Pagliaro, Aug. 14, 1984; and

U.S. Pat. No. 4,922,812 to Schweinfurth, May 8, 1990.

Methods involving molecular imprinting to form synthetic enzymes and synthetic antibodies are also, in general, known. For example the following patents describe various types of these devices:

U.S. Pat. No. 4,111,863 to Wulff, Sep. 5, 1978; and
U.S. Pat. No. 5,110,833 to Mosbach, May 5, 1992.

While the structural arrangements of the above described devices and methods, at first appearance, have similarities with the present invention, they differ in material respects. These differences, which will be described in more detail hereinafter, are essential for the effective use of the invention and which admit of the advantages that are not available with the prior devices and methods.

OBJECTS AND SUMMARY OF THE INVENTION

It is an object of the present invention to provide a method and product for decaffeinating an aqueous solution, such as an extract from vegetable material, using molecularly imprinted polymers that is effective at removing a portion of the caffeine from the aqueous extract.

It is also an important object of the invention to provide a method and product for decaffeinating an aqueous solution, such as an extract from vegetable material, using molecularly imprinted polymers that is economical to use.

Another object of the invention is to provide a method and product for decaffeinating an aqueous solution, such as an extract from vegetable material, using molecularly imprinted polymers that does not introduce unpleasant tastes to the extract.

Still another object of the invention is to provide a method and product for decaffeinating an aqueous solution, such as an extract from vegetable material, using molecularly imprinted polymers that is highly selective in removing the caffeine molecule while leaving unaffected other organic molecules.

Still yet another object of the invention is to provide a method and product for decaffeinating an aqueous solution, such as an extract from vegetable material, using molecularly imprinted polymers that does not expose the extract to substantial amounts of organic solvents or other undesirable or toxic chemicals.

Yet another important object of the invention is to provide a method and product for decaffeinating an aqueous solution, such as an extract from vegetable material, using molecularly imprinted polymers that is safe to use.

Still yet another important object of the invention is to provide a method and product for decaffeinating an aqueous solution, such as an extract from vegetable material, using molecularly imprinted polymers that is effective for use with coffees and teas.

Still yet another further important object of the invention is to provide a method and product for decaffeinating an aqueous solution, such as an extract from vegetable material, using molecularly imprinted polymers that is effective for commercial use.

Still yet another further especially important object of the invention is to provide a method and product for decaffeinating an aqueous solution, such as an extract from vegetable material, using molecularly imprinted polymers that is effective for consumer use.

Still one other object of the invention is to provide a method and product for decaffeinating an aqueous solution, such as an extract from vegetable material, using molecularly imprinted polymers that provides a method for containing the molecularly imprinted polymers useful in decaffeinating the aqueous extract.

Still one other important object of the invention is to provide a method and product for decaffeinating an aqueous solution, such as an extract from vegetable material, using molecularly imprinted polymers that provides an enclosure for containing the molecularly imprinted polymers adapted to permit the aqueous extract to flow through.

Yet one more useful object of the invention is to provide a method and product for decaffeinating an aqueous solution, such as an extract from vegetable material, using molecularly imprinted polymers that increases the variety of coffees and teas that are available in a decaffeinated form to consumers.

Yet one more especially useful object of the invention is to provide a method and product for decaffeinating an aqueous solution, such as an extract from vegetable material, using molecularly imprinted polymers that increases the variety of beverages available to a consumer that can be decaffeinated.

Yet one most useful object of the invention is to provide a method and product for decaffeinating an aqueous solution, such as an extract from vegetable material, using molecularly imprinted polymers that permits a consumer to decaffeinate a beverage.

Briefly, a process in accordance with the principles of the present invention includes the formation of molecularly imprinted polymers (MIPS) that contain an imprint of the caffeine molecule. MIPS to caffeine may be formed, for example, by the addition of caffeine to a polymerization mixture (also known as a "reaction mixture"). The caffeine dissolves in the mixture and mixes with the monomers. Polymerization is then initiated by one (or more) of several possible methods, but typically involves irradiation of the cooled mixture with ultra violet light. However, heating the mixture and/or adding a chemical polymerization initiator are anticipated to be useful alternative methods. The polymer is then ground to form beads which have a plurality of exposed binding (or receptor) sites for caffeine. The beads are then washed using an acidic alcoholic mixture or other preferred cleaning solution to remove the caffeine molecules from the binding sites on the beads and to provide cavities which function as exposed binding sites that correspond to the molecular imprint (i.e., the shape) of at least a portion of the caffeine molecule. An aqueous solution, such as an extract of a vegetable, for example; a brewed cup of coffee or tea, is exposed to the washed beads. The caffeine molecules randomly align with the vacant receptor sites and are thus bound and removed from the aqueous solution. The aqueous solution is allowed to flow past the beads resulting in a decaffeinated beverage. Adherence of the caffeine molecule to each of the receptor or binding sites occurs through a variety of well-known non-covalent interactions. The use of other known and emergent approaches, including the techniques of sacrificial spacer, copper binding site, and novel covalent approaches, to forming the molecularly imprinted polymers to increase efficacy in aqueous solution are also anticipated. A product in accordance with the principles of the present invention is described that includes an enclosure to contain the MIPS and adapted to permit the aqueous solution to pass through the enclosure and commingle with the MIPS.

DETAILED DESCRIPTION OF THE INVENTION

Figure 1:
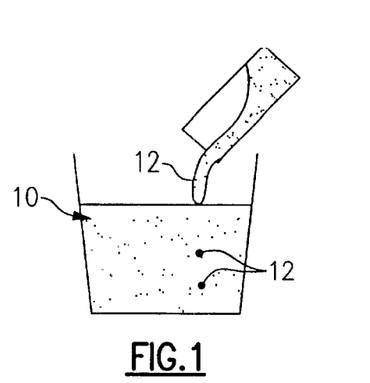
FIG. 1 is a side view of a polymerization solution with caffeine molecules being added thereto.

Referring on occasion to all of the FIGURE drawings and in particular to FIG. 1 is shown a polymer monomer in solution, hereinafter referred to as "the polymerization mixture" and identified in general by the reference numeral 10. The polymerization mixture 10 is also sometimes referred to as a "reaction mixture".

The polymerization mixture 10 includes caffeine molecules, identified in general by the reference numeral 12, being added thereto and in solution throughout the polymerization mixture 10. The caffeine molecules 12 are mixed or blended into the polymerization mixture 10 by stirring the polymerization mixture 10, as desired.

The polymerization mixture 10 contains methacrylic acid (functional monomer), ethyleneglycol dimethacrylate (cross linker), 2,2'-azo-bis-isobutyronitrile (polymerization initiator) and toluene (porogenic solvent). This is one possible formulation for making the polymerization mixture 10.

The caffeine molecules 12 that are added to the polymerization mixture 10 may contain some impurities, but the intent is to introduce a quantity of only the caffeine molecules 12 at this time. Such an addition is sometime referred to as being "exogenous".

Alternatively, other agents or chemicals may be added to the polymerization mixture 10 to aid, as desired, in the homogenization (i.e., the even dispersion) of the caffeine molecules 12 throughout the polymerization mixture 10.

The caffeine molecules 12 are, of course, too small to see individually in the FIG. 1 drawing and are shown only to indicate a concentration thereof as being formed and dispersed throughout the polymerization mixture 10.

It is noted that each of the caffeine molecules 12 are all identical types of structures. At this time, a concentration of the caffeine molecules 12 is being introduced to the polymerization mixture 10 however, hereinafter in the specification it is necessary to refer in general to caffeine molecules that occur naturally and are present in the various aqueous solutions or in vegetables (beans) or aqueous extracts thereof, such as in coffee or tea.

Therefore, when future reference is made to any of the caffeine molecules that occur naturally in any type of an aqueous extract of a vegetable material or which may be present in any aqueous solution, those molecules are also identified as "the caffeine molecule(s) 12". Accordingly, the term "the caffeine molecule(s) 12" is intended to apply to any caffeine molecule or grouping thereof. The context in which the term is used will help to clarify the source and intended purpose.

Figure 2:
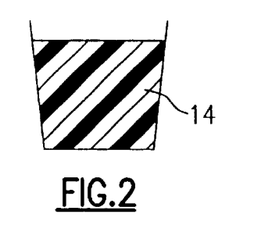
FIG. 2 is a side view of the solidified polymer containing the caffeine molecules embedded in the polymer.

Referring now to FIG. 2, is shown a hardened polymer mass, identified in general by the reference numeral 14. The polymer mass 14 contains the concentration of the caffeine molecules 12 dispersed throughout. (The individual caffeine molecules 12 are not shown in the FIG. 2 drawing or in certain of the other FIG. drawings but they are present (at least to some small extent) in each of the FIG. drawings.

The caffeine molecules 12 have a unique shape, and so they form cavities or pockets throughout the polymer mass 14 that surrounds and contains them. As such, the polymer mass 14 is a formation of a molecularly imprinted polymer (MIP), that is imprinted to the caffeine molecules 12 that they contain. A very large number of the caffeine molecules 12 are contained in the polymer mass 14 (MIP).

There are at least three known ways to change the polymerization mixture 10 into a solid so as to form the polymer mass 14. The first is by irradiating the polymerization mixture 10 that is used with ultra-violet light so that it changes state from a liquid into a solid. This is a preferred method and is used with the formulation for the polymerization mixture 10 given hereinabove.

Alternative ways to form the polymer mass 14 are by heating and/or the addition of a chemical polymerization initiator that is mixed with the polymerization mixture 10, thereby changing it from a liquid state into a solid state.

While in solution (liquid state), the polymerization mixture 10 is said to contain monomers and when it is hardened into a solid it is referred to as a polymer or as referenced herein, the polymer mass 14.

The initiator, whichever is used, causes the monomers to link together and to form a solid. The monomers seek the tightest configuration possible as they solidify around the caffeine molecules 12. As a result, the polymer mass 14 contains an innumerable quantity of the caffeine molecules 12 that are each tightly surrounded by the polymer mass 14.

Processes to form the polymer mass 14 are well known in the plastic arts. However, an analogy to illustrate how the caffeine molecules 12 are enclosed by the polymer mass 14, which is new, may be useful. The analogy has an irregularly shaped rock (not shown) suspended in water (not shown) while the water is cooled so as to form ice (not shown). The rock represents one of the caffeine molecules 12 and the water represents the polymerization mixture 10 (i.e., the monomers) and the ice represents the polymer mass 14.

As the water freezes, the ice forms an enclosure, or a cavity or a pocket, that surrounds the irregularly shaped rock. If the ice were cut in two around a maximum circumference of the rock and the rock was then removed from the cavity, the ice would reveal two pockets, each pocket being a very close match to the shape of the rock. The surface pattern and irregularity of the surface of the rock would correspond with that of each pocket.

No other rock would fit into the pocket as perfectly as would the rock that the ice surrounded. In fact, if the rock were correctly aligned and placed into either pocket, it would fit in there so well that it would naturally stay in place unless it was acted upon by some force to remove it.

Figure 3:
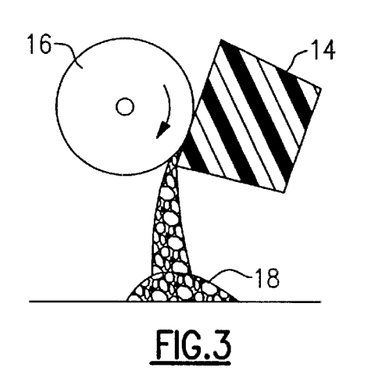
FIG. 3 is a side view of the solidified polymer being ground to form polymer beads.

Referring now to FIG. 3 is shown a grinding wheel 16 to which the polymer mass 14 is being applied and ground into a plurality of unwashed polymer beads, identified in general by the reference numeral 18. Each of the unwashed beads 18 contains innumerable caffeine molecules 12, many of which are at the surface of the unwashed beads 18. Some of the caffeine molecules 12 that were used to form the imprint are surrounded by and therefore contained within the unwashed beads 18. They remain therein and are of no consequence.

It is only the caffeine molecules 12 that happen to be disposed on the surface of each of the unwashed beads 18 that are of consequence because they provide the locations for the caffeine molecules 12 to later adhere to that are part of the coffee or tea (beverage) that is to be decaffeinated, as is described in greater detail hereinafter. But first, many of the caffeine molecules 12 that are disposed on the surface of the unwashed beads 18 that were initially used to imprint the MIPS must be removed to make room for the caffeine molecules 12 that occur normally in the coffee or tea, as is described in greater detail hereinafter.

The unwashed beads 18 form a plurality of molecularly imprinted polymers (MIPS) because they each contain (ideally) a great many imprints of the caffeine molecules 12. Some of these imprints are on the surface and some, as mentioned hereinabove, are contained within the unwashed beads 18. The polymer mass 14 (MIP), after grinding, includes a plurality of smaller pieces that form the unwashed beads 18 (MIPS).

There are many ways for forming the unwashed beads 18 from the polymer mass 14 and include, for example, grinding, pulverizing, or fracturing the polymer mass 14 so as to produce the unwashed beads 18. The illustration of the grinding wheel 16 is intended to reveal a way, but by no means to limit their formation.

Depending upon the application, the polymer mass 14 may be ground to produce the unwashed beads 18 having any desired range of sizes (diameters). Obviously, the finer the unwashed beads 18 are, the greater will be the resultant surface area. The process of decaffeination is described in greater detail hereinafter, however for now it is sufficient to note that a greater surface area translates into more opportunities to capture the caffeine molecules 12 (for example, from the coffee or tea) simply because there are more receptor sites available, as is also discussed in greater detail hereinafter.

Therefore, a smaller (finer) granulation of the unwashed beads 18 will, generally, improve the efficacy of the decaffeination process.

However, there are situations where a larger diameter or coarser size for the unwashed beads 18 is desirable, such as to improve the containment of them (or of the washed beads 22, as is described in greater detail hereinafter). After the unwashed beads 18 have been cleaned, they are herein referred to as "washed beads" and are identified by the reference numeral 22.

Commercial or consumer applications that reuse the washed beads 22 may benefit from a coarser type of the unwashed and the washed beads 18, 22. A coarser variety likely will be more durable for repeated use (repeated use is described in greater detail hereinafter) or, as mentioned hereinabove, they may be more easily contained. Containment of the washed beads 22 during use is described in greater detail hereinafter.

Figure 7:
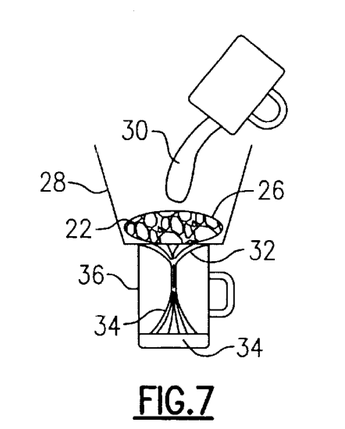
FIG. 7 is a side view of an aqueous extract (i.e., a caffeinated beverage) in a first container being exposed to the polymer beads and collected in a second container after a portion of the caffeine molecules have been removed by the beads.

If coarser types of the washed beads 22 are used and it is desirable to increase the efficacy of the decaffeination process, then either more of the coarser variety of the washed beads 22 may be used or the length of time of exposure of an aqueous solution 30, such as an extract of a vegetable material (The aqueous solution 30 is shown in FIG. 7 and is discussed in greater detail hereinafter.) that is to be decaffeinated to the washed beads 22 may be increased, or both, as are described in greater detail hereinafter.

Not to serve as a limitation, but rather to indicate a possible size for the unwashed or the washed beads 18, 22, a diameter thereof of approximately 25 um (micrometers) is anticipated. Larger and smaller diameters of the unwashed beads 18 and the washed beads 22 are certainly anticipated and are determined by the application at hand and by the economics to produce the unwashed and washed beads 18 22, as well.

Figure 4:
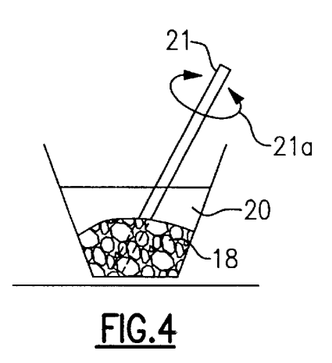
FIG. 4 is a side view of the polymer beads being washed to remove the caffeine molecules from the surface thereof.

Referring now to FIG. 4, the unwashed beads 18 are in a cleaning solution 20, in which they are stirred and agitated, sufficient to remove the caffeine molecules 12 therefrom that are bound to the receptors on the surface of the beads 18. This step is the washing (or cleaning) of the beads 18 to remove the caffeine molecules 12 on the surface thereof that were initially added to and mixed with the polymerization mixture 10.

Figure 9:
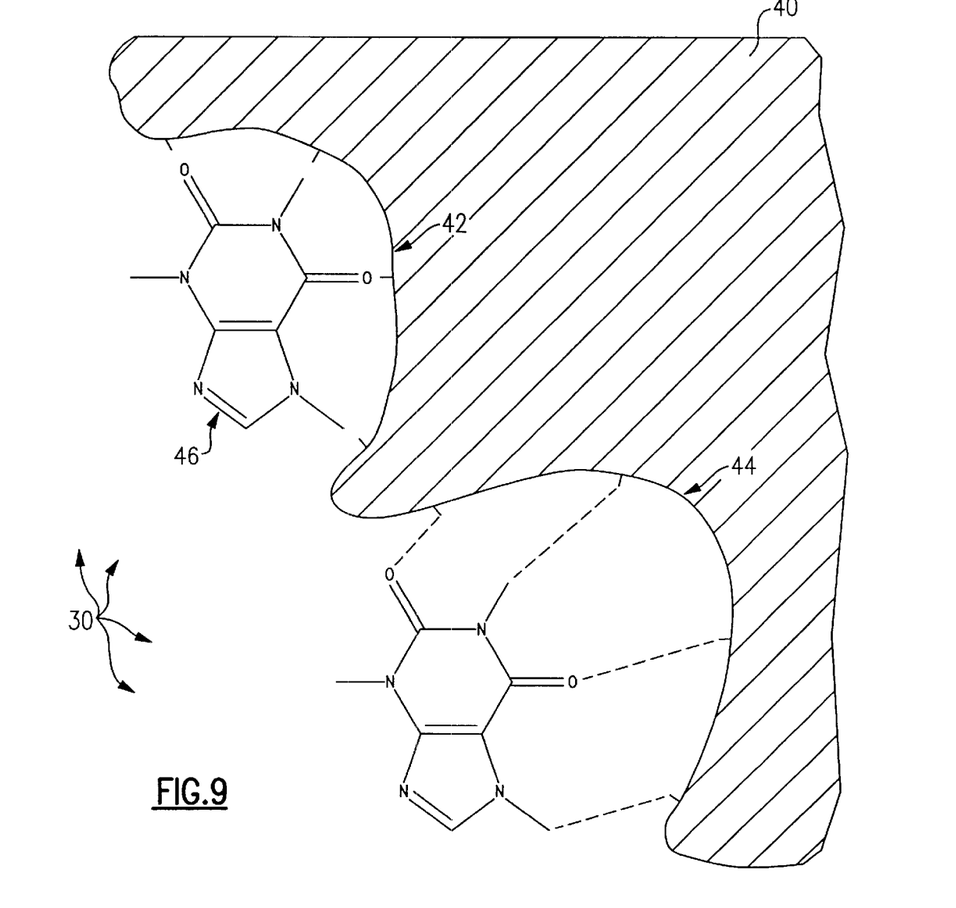
FIG. 9 is a side view of a caffeine molecule attached to a receptor site on a polymer bead.

Any of the terms (singular or plural) "receptors", "sites", "surface sites", "receptor sites", "binding sites", "cavities", "imprints", "surface imprints", or "caffeine receptors" as used, are interchangeable and refer to any of a plurality of locations on the surface of the unwashed beads 18 and the washed beads 22 to which the caffeine molecules 12 may adhere (bind), as is discussed in greater in detail hereinafter. Two such locations are shown in FIG. 9 where they are identified as a first receptor site 42 and a second receptor site 44.

The cleaning process is repeated as often as necessary and by using whatever is the preferred method or material to form the cleaning solution 20 until the surface of the unwashed beads 18 have been adequately cleaned (i.e., a sufficient amount of the caffeine molecules 12 have been removed).

For example, simply washing with hot soapy water is possible and may provide acceptable results (i.e., a sufficient amount of caffeine molecules 12 being removed) for certain applications or the use of an acidic solution, tantamount to a lemon-water solution, may be used to form the cleaning solution 20, followed in each case by rinsing with pure water. Similarly, the use of an acidic alcoholic mixture may be used to form the cleaning solution 20.

The use of solvents, in particular organic solvents, is also possible. It is noted that the undesirable effects as were discussed hereinabove in the BACKGROUND OF THE INVENTION, arising from use of organic solvents in the decaffeination process do not apply in this instance because their usage is different.

The use of organic solvents in prior types of decaffeination methods require that the vegetable material (i.e., the coffee or tea) be directly exposed to the organic solvents or that the aqueous solution 30 of the vegetable material be so exposed. In other words, prior processes require that the actual foodstuff be exposed to the organic solvents. The direct exposure of the vegetable material (or the aqueous solution 30 from an extract thereof) at high concentration levels to the organic solvents is what produces the undesirable effects as were discussed hereinabove. It also necessitates that large quantities of organic solvents be used.

The use of organic solvents, if they are used to form the cleaning solution 20, is substantially different because the vegetable material (i.e., the coffee or tea) is not directly exposed to the organic solvents nor is the aqueous solution 30 of the vegetable material directly exposed to any of the organic solvents.

Rather, according to the presently disclosed processes, only the unwashed beads 18 are exposed to the cleaning solution 20 which can, if desired, contain various types and concentrations of the organic solvents (and/or other types of solvents) to remove the caffeine molecules 12 from the surface of the beads 18.

The unwashed beads 18 are then further exposed to other formulations of the cleaning solution 20 to further wash and clean them and therefore to remove a sufficient amount of the organic solvent (or other type of a solvent) residue which may be present on the unwashed beads 18 to a sufficiently low level. In this way, and as is described in greater detail hereinafter, neither the vegetable material (i.e., the coffee or tea) nor the aqueous solution 30 thereof are exposed to the organic solvents during the decaffeination process.

According to an embodiment of the present invention in which organic solvents are used to clean the unwashed beads 18, the aqueous solution 30 of the vegetable material is exposed (at most) only to trace amounts of the organic solvent (or any other type of a solvent) in the form of residue that might possibly remain on the surface of the unwashed beads 18. As is described in greater detail hereinafter, after the unwashed beads have been washed they are referred to as "washed beads 22". Accordingly, it is more accurate then to state that any residue which the aqueous solution 30 may be exposed to are on the washed beads 22, rather than on the unwashed beads 18.

The residue, if any, being of a very low concentration level, is of no significant consequence and therefore overcomes the prior disadvantages arising from the use of try organic solvents in the decaffeination process.

In particular, the use of the organic solvents, if desired, to clean the unwashed beads 18 does not significantly affect the taste of the resultant decaffeinated product because cleaning of the unwashed beads 18 does not expose the product that is to be decaffeinated to the organic solvents. This is described in greater detail hereinafter, however, it is significant to again note that any use of the organic solvents with the present invention is only to clean the unwashed beads 18. By way of contrast to certain of the prior methods, exposure of the product that is to be decaffeinated directly to any of the organic solvents may remove a number of organic substances in addition to caffeine.

Removal of the other types of organic substances, other than the caffeine molecules 12, may adversely affect the taste of the resulting decaffeinated product so produced. This is because certain of the other types of organic substances add flavor, aroma, and hue, and so their removal from a beverage, such as coffee or tea, would lessen the taste (i.e., the character) of the resultant beverage. It is especially desirable that any process for decaffeinating the beverage is highly selective only removing significant amounts of the caffeine molecules 12 and little or none of the other types of organic substances as may be present in the aqueous solution 30 or extract of a vegetable material.

In addition, because the decaffeinated product produced by the methods herein described does not expose the decaffeinated product to concentrated levels of organic solvents, the decaffeinated product will itself contain far lower levels (amounts) of the organic solvents than, for example, if produced by certain of the other prior art methods. Accordingly, because the organic solvents may, of themselves, introduce unwanted tastes into the decaffeinated product, the currently described inventive methods do not alter the taste of the decaffeinated product because they do not add significant quantities of unwanted organic solvents or other compounds or active ingredients thereto.

As a further consequence, the currently disclosed inventive processes lessen the amount of exposure to organic solvents (and other types of solvents) that confront a consumer of such a decaffeinated type of a product and therefore, the decaffeinated product that results from the application of the currently disclosed methods is safer for the consumer to consume.

Referring again in particular to FIG. 4, a rod 21 is shown in contact with the unwashed beads 18 in the cleaning solution 20. The rod 21 is being stirred, as indicated by arrow 21a. The use of the rod 21 (or other mechanical means) to stir the beads 18 is well known in the cleaning arts, generally, and produces a more effective cleaning (washing) action as a result of a mechanical motion being imparted to the unwashed beads 18 while they are exposed to the cleaning solution 20.

The rod 21 and stirring action 21a can be omitted, if desired. Of course, the use of other types of devices (not shown) to further agitate the unwashed beads 18 are anticipated so as to more effectively wash them. For example, a simple shaking of the unwashed beads 18 and the cleaning solution 20 can be used. This shaking can be at any desired frequency including any of the higher frequencies that are associated with cleaning items in solution. These higher frequencies are sometimes referred to as "ultrasound", being of a frequency that resides above the auditory range of most people.

What is important is to utilize all available technologies to economically, quickly, and safely clean the unwashed beads 18. Cleaning the beads 18 means removing a sufficient amount of the caffeine molecules 12 therefrom. It also includes the removal of a sufficient amount of any residue of the cleaning solution 20 itself, such as by repeatedly rinsing the unwashed beads 18 with pure water.

To continue the rock and ice analogy from hereinabove, the step of grinding the polymer mass 14 and the step of washing (i.e., cleaning) the unwashed beads 18 would be the fracturing of the ice so as to permit the removal of the rock from the surface of the ice.

Figure 5:
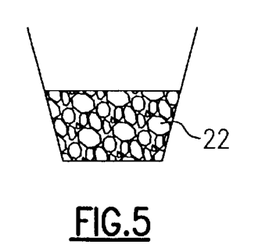
FIG. 5 is a side view of the washed and dried polymer beads.

Referring now to FIG. 5, after sufficient exposure to the cleaning solution 20 has occurred, the result yields a quantity of the washed beads 22, as shown. The washed beads 22 are the unwashed beads 18 that have been cleaned so as to have had a sufficient proportion of the caffeine molecules 12 removed from the surfaces thereof. Certain of the caffeine molecules 12 (from the original added concentration of the caffeine molecules 12) will remain, as mentioned hereinabove, inside of the various washed beads 22, however they are not of concern in that they are each surrounded by parts of the polymer mass 14, and are, therefore, contained.

The washed beads 22 are dried, if desired, by any manner that is preferred. The washed beads 22 include many cavities which function as specific binding (i.e., receptor) sites for the caffeine molecules 12 (in the aqueous solution 30) at the surface thereof and which correspond with at least a portion of the molecular shape of the caffeine molecule 12.

These cavities, which as mentioned hereinabove are also referred to surface sites, receptor or receptive sites, binding sites, etc., are the shapes that remain after the caffeine molecules 12 (from the concentrated mixture) have been removed from the surfaces of the washed beads 22. They are the spaces that remain on the surface of the washed beads 22 from where the caffeine molecules 12 have been removed and their function is discussed in greater detail hereinafter (see also FIG. 9).

Figure 6:
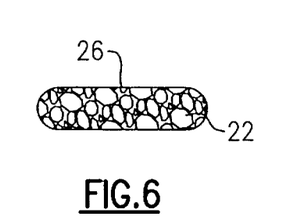
FIG. 6 is a side view of the washed and dried polymer beads in an enclosure.

Referring now to FIG. 6, a predetermined quantity (the magnitude of which depends upon the intended application) of the washed beads 22 are placed in an enclosure 26. The enclosure 26 includes a covering that forms a semi-permeable membrane that includes a plurality of pores, identified as entry pores 27a and as exit pores 27b that form openings, holes, or apertures small enough to allow the aqueous solution 30 to pass through while retaining the washed beads 22 therein. The covering of the enclosure 26 is formed of cloth, paper, metallic mesh, or any desirable synthetic or other type of a substance.

Referring now to FIG. 7, the enclosure 26 is shown placed within a first container 28. The aqueous solution 30, such as a brewed cup of coffee or tea that contains an abundance of the caffeine molecules 12 naturally occurring therein, is poured over the enclosure 26. The aqueous solution 30 is, primarily, an aqueous extract derived from a vegetable material by any of many known methods. The aqueous solution 30 (or aqueous extract) must, as mentioned hereinabove, contain at least some caffeine or, obviously, there would be no need to expose it to the decaffeination process that is presently disclosed. Alternatively, the aqueous solution 30 is any beverage or the like that contain caffeine.

However, it is worth noting that even if a modified type of an aqueous solution [not shown] that did not contain caffeine was subjected to the processes herein disclosed, no effect would occur and therefore the process would not affect the modified type of the aqueous solution. Consequently, on those occasions when it is not know for certain whether the modified type of the aqueous solution contains caffeine or not, the presently disclosed processes may be utilized.

The aqueous solution 30 (i.e., of the brewed coffee or tea) flows through the openings and into the enclosure 26 where it commingles with the washed beads 22 that are disposed therein.

A portion of the caffeine molecules 12 that are dispersed in the aqueous solution 30 (of the brewed coffee or tea) are deposited in and adhere to the receptor (surface) sites of the washed beads 22, thereby capturing some of the caffeine molecules 12 and effectively removing them from the aqueous solution 30.

To continue the ice and rock analogy, it is as if water (which represents the aqueous solution 30) containing the rock was poured over the ice. To further the analogy, the water would contain many identically shaped rocks (and possibly other differently shaped rocks) and the ice would contain many identically shaped cavities that correspond to the shape of at least a portion of each of the identically shaped rocks.

Eventually, portions of some of the identically shaped rocks properly align with correspondingly shaped portions on some of the cavities, into which they are deposited and, accordingly, deposited. As they are deposited, they become captured and are effectively removed from the flow of the water. The differently shaped rocks do not find matching cavities, are not deposited, and therefore are not removed from the water. So it is also with the caffeine molecules 12 in the aqueous solution 30 in that they too are deposited into the receptor sites and are removed from the aqueous solution 30. The differently shaped rocks, from the analogy, would correspond with the various other molecules in the aqueous solution 30 that are not targeted by the receptor sites (i.e. the cavities), are not deposited, and therefore not removed from the aqueous solution 30. (Refer also to FIG. 9)

Continuing the analogy, the remaining water will have had a certain number of the "identically shaped rocks" removed by this process. With regard to the target rock, namely those which are identically shaped, the final supply of water will have been "de-rocked", for lack of a better word.

Similarly, referring again to FIG. 7, the aqueous solution 30 will have had a certain number of the caffeine molecules 12 removed therefrom. Any process of removing a portion of the caffeine molecules 12 from a substance is generally referred to in the art as "decaffeination", and the resultant product is said to be "decaffeinated" and is herein referred to as a "decaffeinated aqueous solution 34".

The first enclosure 28 includes an orifice 32 at the bottom thereof, through which the decaffeinated aqueous solution 34 passes into a second container 36. The decaffeinated aqueous solution 34 consists of the brewed coffee or tea, for example, that originally formed the aqueous solution 30 but with a portion of the caffeine molecules 12 removed therefrom.

What is significant is that no chemicals are used in the decaffeination process as it involves the aqueous solution 30. The washed beads 22, being essentially beads of plastic, are inert. As such, an inert process that selectively targets and removes only the caffeine molecules 12 is provided.

The decaffeination process as herein described does not add nor does it expose the aqueous solution 30 to other potentially toxic or hazardous substances. The resultant decaffeinated aqueous solution 34 is a product that has had a portion of the caffeine molecules 12 removed therefrom. Furthermore, no other substances (i.e., organic molecules other than the caffeine molecules 12) have been removed from the aqueous solution 30 to any magnitude worth noting.

When dealing on the molecular level in a practical environment, it is of course impossible to make assertions that are accurate to the molecule. It is sufficient to note that no other compound or organic compound is targeted by the decaffeination process. Therefore the subtle taste attributes of the original beverage (the aqueous solution 30), for example of the coffee or the tea, are maintained with the sole exception being that which is caused by the loss of a portion of the caffeine molecules 12.

By increasing the time the aqueous solution 30 is exposed to the washed beads 22, the likelihood that more of the caffeine molecules 12 therein will find adherence with the receptor sites (cavities) on the washed beads 22 is also increased.

Changing the size of the orifice 32 so that it is smaller in size or diameter would be one way to increase the exposure time of the aqueous solution 30 to the washed beads 22 because a smaller size for the orifice 32 would prolong the time required for the decaffeinated aqueous solution 34 to flow through it. Therefore regulating the size of the orifice 32 serves as a method useful to regulate the efficacy of the decaffeination process.

A smaller pore (i.e., hole) size in the enclosure 26, especially on the exit side thereof, would similarly also prolong the exposure time of the aqueous solution 30 to the washed beads 22. Accordingly, a plurality of exit pores 27b (FIG. 6) are formed so as to be smaller in size than a plurality of entry pores, 27a (FIG. 6). This prolongs the exposure time by readily permitting the aqueous solution 30 to flow into the enclosure 26 (through the entry pores 27a) while increasing the time it takes for the decaffeinated aqueous solution 34 to exit from the enclosure 26 (through the exit pores 27b).

Of course, another way to regulate the efficacy of the process is by increasing or decreasing the number of washed beads 22 that the aqueous solution 30 is exposed to. More washed beads 22 for the aqueous solution 30 to pass by provides more sites to capture the caffeine molecules 12 and therefore more opportunities to remove the caffeine molecules 12 from the aqueous solution 30. Conversely, less washed beads 22 will provide less binding sites and less removals. Accordingly, another method to regulate the efficacy of the decaffeination process is provided by varying the quantity of the washed beads 22 to which the aqueous solution 30 is exposed.

Also, by varying the density of the caffeine molecules 12 in the polymer mass 14, it is possible to influence the resultant number of receptor sites on the washed beads 22. More caffeine molecules 12 results in an increased density of receptor sites on the unwashed and washed beads 18, 22 and a corresponding increase in efficacy of the decaffeination process. Correspondingly, less caffeine molecules 12 being present when the polymer mass 14 is being formed will result in fewer binding sites and fewer of the caffeine molecules 12 being removed from the aqueous solution 30. Accordingly, another method to regulate the relative number of the caffeine molecules 12 that remain in the decaffeinated solution 34 is provided.

Still another way to regulate the efficacy is to control the quantity of the aqueous solution 30 that will be exposed to the washed beads 22. If a small quantity of aqueous solution 30 is exposed to the washed beads 22, then ample receptor sites will be available in the washed beads 22 for capture of the caffeine molecules 12. If a larger quantity of the aqueous solution 30 is exposed to the washed beads 22, then certain of the receptor sites will contain the caffeine molecules 12 that have been deposited therein from an earlier extraction from the aqueous solution 30 thereby preventing the capturing of additional quantities of the caffeine molecules 12 in those "already filled sites", thereby reducing the efficacy of the process.

Other methods to regulate the efficacy of the decaffeination process are also anticipated. For example, varying the temperature of the aqueous solution 30 may be useful in influencing the ease by which the caffeine molecules either find or remain adhered to the receptor sites on the washed beads 22.

For example, a cold (i.e., chilled) container (not shown) of a cola soda (as the aqueous solution 30) can be exposed to the washed beads 22 and, accordingly, decaffeinated. The cola soda can, if preferred, be exposed to the washed beads 22 at a higher temperature, such as at room temperature. In combination with all of the methods herein disclosed, the temperature of the aqueous solution 30 is yet one other factor that is varied, as desired, to influence the efficacy of the overall process.

It is important to note that the aqueous solution 30, while primarily being an extract formed from a vegetable material, is not limited as such. Beverages, such as sodas and the like, that have had caffeine added thereto may be decaffeinated by these processes as well. These beverages may contain, at a minimum, water and artificial flavorings and colorings and added caffeine. They may or may not be carbonated beverages, as preferred. Any solution in water that contains a plurality of the caffeine molecules 12, whether the caffeine molecules 12 occur naturally or have been added thereto, may form the aqueous solution 30 and may be decaffeinated by the processes as disclosed herein and which are described in greater detail hereinbefore and hereinafter.

Regulating the number of the washed beads 22 may be combined with regulating the time of exposure of the aqueous solution 30 to the washed beads 22, as desired, to further determine the efficacy of the process, as may the quantity of aqueous solution 30 also be regulated in combination with any other influencing factor.

The decaffeination process is accomplished to the degree of efficacy as the limits of the process determine in conjunction with consumer (not shown) preferences. For example, if the consumer wishes to have only 20–30% of the caffeine molecules 12 removed from the aqueous solution 30, the process is regulated to ensure that the decaffeinated aqueous solution 34 falls within that range. If the consumer wishes to have a greater percentage of the caffeine molecules 12 removed, the efficacy of the process is regulated by any preferred means to attain the desired degree of decaffeination.

There is no limit inherent with this process that would prevent achieving any desired decaffeination efficacy approaching the limit of 100% removal of the caffeine molecules 12 from the aqueous solution 30. Of course, no process is perfect and therefore it is unrealistic to imagine that all of the caffeine molecules 12 can be removed. Accordingly, 100% is not a practical efficacy to attain with this or any other known process for decaffeination.

It should be noted that the decaffeination process as herein disclosed, provides opportunities for commercial as well as consumer use. The scale can be varied to suit either.

After a predetermined quantity of the washed beads 22 have been exposed to a predetermined quantity of the aqueous solution 30, it can be assumed that the efficacy of the process will diminish, as many of the sites for binding become filled with the caffeine molecules 12 thereby rendering progressively fewer open (available) receptor sites.

Either a new stock (supply) of washed beads (not shown) would then be utilized or the previously used quantity of the washed beads 22 that have subsequently become saturated (to some extent) with the caffeine molecules 12 would again be cleaned and then reused. For the consumer, simply soaking the washed beads 22 with a mildly acidic solution (vinegar, lemon juice, etc.) and then rinsing with water would likely remove a sufficient quantity of the caffeine molecules 12 therefrom so as to allow for reuse of the washed beads 22. Drying them may again be preferred, but is not deemed to be necessary. After a predetermined period of time of exposure to a new quantity of aqueous solution (not shown) they will again became saturated with the caffeine molecules 12 and again require cleaning (washing).

Alternatively, a consumer cleaning solution (not shown) that contains any of the cleaning substances mentioned hereinabove (or other types of cleaning substances) may be marketed specifically for the purpose of allowing consumers to clean the washed beads 22 after they have become saturated with the caffeine molecules 12.

The consumer cleaning solution may include any desired cleaning agent or agents but it is preferred that those agents be as non-toxic as possible, should the consumer fail to adequately rinse off the agents before reusing the washed beads 22. If desired, the acidic alcoholic mixture, mentioned hereinabove, can be used to clean the washed beads 22 after they have become saturated with the caffeine molecules 12 from the aqueous solution 30.

The number of wash cycles that the washed beads 22 may be subjected to is a function of the type of material used to form the enclosure 26 as well as the durability of the washed beads 22. A paper covering for the enclosure 26, of the kind as is commonly used to form a drip coffee cone type of a filter paper cone (not shown), if used, would not favor reuse of the enclosure 26. A paper covering would imply single use type of applications. Of course, a significant potential market is anticipated to supply replacement enclosures 26 (paper or otherwise) as disposable items after a single or, alternatively, a limited number of uses.

A more durable material, such as cloth or synthetic fabric when used to form the covering for the enclosure 26, is better adapted for repeated washing and for multiple use applications. The use of a mesh covering, in particular a steel or heavy duty fabric or synthetic mesh covering, is especially well suited for this purpose in forming the enclosure 26.

The use of a chemical compound (not shown) that is added to the aqueous solution 30 to improve adherence (binding) of the caffeine molecules 12 to the sites is also anticipated. Of course, the chemicals so used must be either benign (i.e., non-toxic), adhere steadfastly to the washed beads 22 during decaffeination, or be readily removable from the decaffeinated aqueous solution 34 by some other process prior to its consumption.

The use of a chemical additive is also anticipated when the polymerization mixture 10 is initially formed, if other types of chemical bonding are desired (refer momentarily again to FIG. 1). For example, using the Wulff-type of approach to produce the MIPS will require admixing with a derivative of caffeine that is used to link to the polymer monomers (i.e., "the polymerization mixture 10"). Accordingly, U.S. Pat. No. 4,111,863 to Wulff, that issued on Sep. 5, 1978 is incorporated by reference herein. The derivative of caffeine molecules (not shown), bound covalently to the polymer mass 14, would then be chemically cut (severed) from the unwashed beads 18 at appropriate chemical locations during processing. This may result in a stronger chemical attraction, such as by covalent bonding, with the caffeine molecules 12 of the aqueous solution 30 that would later be exposed to a modified type of washed beads (not shown).

Figure 8:
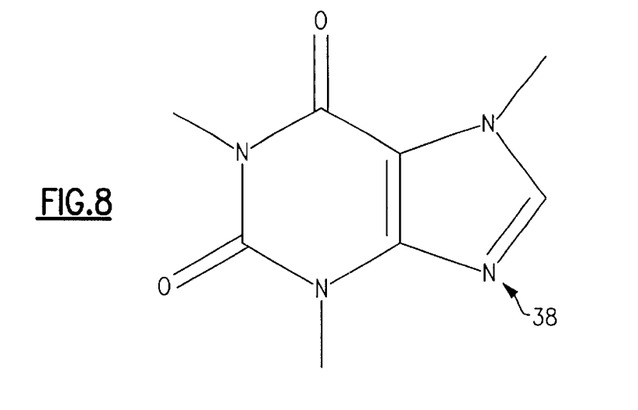
FIG. 8 is an image of the chemical structure of a caffeine molecule.

Referring now to FIGS. 8 and 9, a more detailed description of the process that leads to the adherence of the caffeine molecules 12 to the sites is shown. An image of the chemical structure of a caffeine molecule, identified in general by the reference numeral 38, applies to any of the caffeine molecules 12. The purpose is to show that the caffeine molecule 12 has a characteristic shape, as do all molecules. The shape of any molecule can be thought of as being analogous to its unique finger print. No two different types of molecules share the same "fingerprint" or shape because no other molecules share the same atoms arranged in the same way. Therefore an imprint designed to capture a particular molecule is selective and highly specific for that particular molecule.

Continuing the rock and ice analogy from before, the shape of the caffeine molecule 12 is unique as is the shape of the identically shaped rock (or identically shaped rocks) that were used in the analogy.

The process can also be compared to an attempt to open a lock with a key. The match between lock and key is highly specific and only the assigned key will open the door. With molecular imprinting only the correctly shaped molecule fits into the physical "key holes" (receptor sites) that are provided in the washed beads 22.

Referring again to FIG. 9, is shown, a very small portion of a slice of one of the washed beads, identified by the reference numeral 40, and identified hereinafter as "the washed bead 40", which, of course, has been greatly magnified in size. A first receptor site 42 and a second receptor site 44 are shown.

It is noted that many, many additional receptor sites (not shown) will be present on the surface of the washed bead 40. It is noted that each of the washed beads 22 and the washed bead 40 is itself a finely ground sieve or fine, approximately 25 um diameter (or larger or smaller depending upon the desired application), and therefore a very great many of them together constitute the washed beads 22.

It should also be noted that the first and second receptor sites 42, 44 are three dimensional structures and the view, as shown, depicts only a two dimensional view or "slice" thereof.

A first caffeine molecule 46 is shown in a position of cooperation with the first receptor site 42. The first caffeine molecule 46 has been deposited in the first receptor site 42 and thus extracted from the aqueous solution 30 as it attempted to pass by the first receptor site 42. Various chemical and atomic forces in cooperation are responsible for depositing and for the adhesion of the first caffeine molecule 46 sufficient to retain it in a position of cooperation proximate the first receptor site 42.

Certain of these forces that retain the first caffeine molecule 46 in a position of cooperation proximate the first receptor site 42 of the washed bead 40 include hydrogen bonding, electrostatic bonding, and non-specific non-covalent bonding. As is well known in the chemical arts, various means may be employed to vary the influence of these forces, as desired.

It is also understood that the bonding of any of the remaining caffeine molecules (not shown) with other receptor sites (not shown) may or may not include the same number of chemical interactions as is shown in the drawing FIG. 9.

When the grinding operation occurs so as to produce the unwashed beads 18, they may produce various matching profiles. Therefore, the actual physical and chemical profile of the sites will vary from site to site, but in general the shape of all of those sites that are targeted for the caffeine molecule 12 will correspond with at least some portion of the shape of the caffeine molecule 12.

Of course, due to imperfections in the process and impurities other trace molecular sites will also occur in the unwashed beads 18, however their frequency will be low and insignificant. These imperfections are responsible for removal of other substances in trace amounts from the aqueous solution 30.

It is also possible that some of the receptor sites that do contain an imprint of the caffeine molecule 12 will, on occasion, inadvertently remove a molecule (not shown) other than the caffeine molecule 12 that is targeted, however, this again is of such a low probability of occurrence so as to be statistically insignificant.

As the rest of aqueous solution 30 flows past the washed bead 40 and also as it flows past the remainder of the washed beads 22, of which the washed bead 40 is but one part, the first caffeine molecule 46 is extracted (removed) apart from the original aqueous solution 30.

A second caffeine molecule 48 is shown near but not in a position of cooperation with the second receptor site 44. The second caffeine molecule 48 has already aligned itself (on a molecular level) with the second receptor site 44 and is experiencing an attraction thereto. Accordingly, the second caffeine molecule 48 will be drawn into a position of cooperation with respect to the second receptor site 44 where it too shall be deposited and removed (extracted) apart from the aqueous solution 30 as a continuing part of the decaffeination process.

When this process is repeated countless millions of times, a substantial amount of the caffeine molecules 12 that were part of the aqueous solution 30 will have been extracted from the aqueous solution 30 thereby creating the decaffeinated aqueous solution 34. As a result of mere contact by the aqueous solution 30 with the washed beads 22, the aqueous solution 30 loses some of the caffeine molecules 12 it contains and, as such, is transformed into the decaffeinated aqueous solution 34.

Accordingly, the disclosed process for decaffeinating the aqueous solution 30 is inert in that no active chemicals or ingredients are needed to remove the caffeine molecules 12 from the aqueous solution 30.

The decaffeinated aqueous solution 34 is ready for consumption or additional processing, as desired. The additional processing may consist of freeze-drying it, for example, to make a commercially available freeze-dried decaffeinated coffee product. It may alternately be processed in other ways to make other decaffeinated products.

If it is to be consumed directly it can, if preferred, be heated or re-heated, as desired, prior to consumption or it may be directly consumed.

It is also noted that the washed beads 22, once exposed to a sufficient quantity of the aqueous solution 30, eventually become, as mentioned hereinabove, saturated with the caffeine molecules 12. As also mentioned hereinabove, they may then be washed to remove a portion of the caffeine molecules 12 and, possibly, reused.

It is also important to note that when the saturated washed beads 12 are being washed, the caffeine molecules 12 may be collected and used for other purposes. One such purpose includes their use in providing a source of the caffeine molecules used initially to form the polymer mass 14. Alternatively, they may be sold and used for a variety of consumer products that contain added amounts of the caffeine molecules 12. These range from a variety of caffeinated beverages to lozenges high in caffeine intended to promote awareness and to prevent dozing (sleeping) as well as for any other intended use. Therefore, a method useful in accumulating a concentration of the caffeine molecules 12 is also provided. The concentration so obtained would exhibit a very high level of purity (i.e., contain mostly the caffeine molecules 12 and a very low occurrence of other types of molecules).

It is also noted that the surface of the washed beads 22 may contain a relatively small amount of the caffeine molecules 12 (from the concentrated extract) that were not removed when the unwashed beads 18 were first washed with the cleaning solution 20 (See FIG. 4). This is not of concern for two reasons. First, the caffeine molecules 12 that remain on the surface of the washed beads 22, having already resisted their removal from the surface by the cleaning solution 20, are not likely to become dislodged when the aqueous solution 30 is added thereto. Secondly, even if some of them were, in fact, to dislodge, the effect is negligible because for every one such possible addition to the aqueous solution 30, it would be offset by hundreds or thousands, if not millions of removals of the caffeine molecules 12 from the aqueous solution 30, thereby ensuring that the final product produced is, when compared to the aqueous solution 30, the decaffeinated aqueous solution 34.

Current research and experimentation shows that successful binding of MIPS to their targets in aqueous environments is possible and certain of these approaches have been described in various publications in the last few years, although not anticipating the currently disclosed uses. It is anticipated that these and other new approaches to the binding of the targeted caffeine molecules 12 to MIPS in the aqueous solution 30 will be developed to make better utilization of the invention as herein described. The current disclosure anticipates that increasingly optimal binding characteristics for the synthesis of MIPS to caffeine will be found as a result of an understanding arising from the disclosure presented herein.

Figure 10:
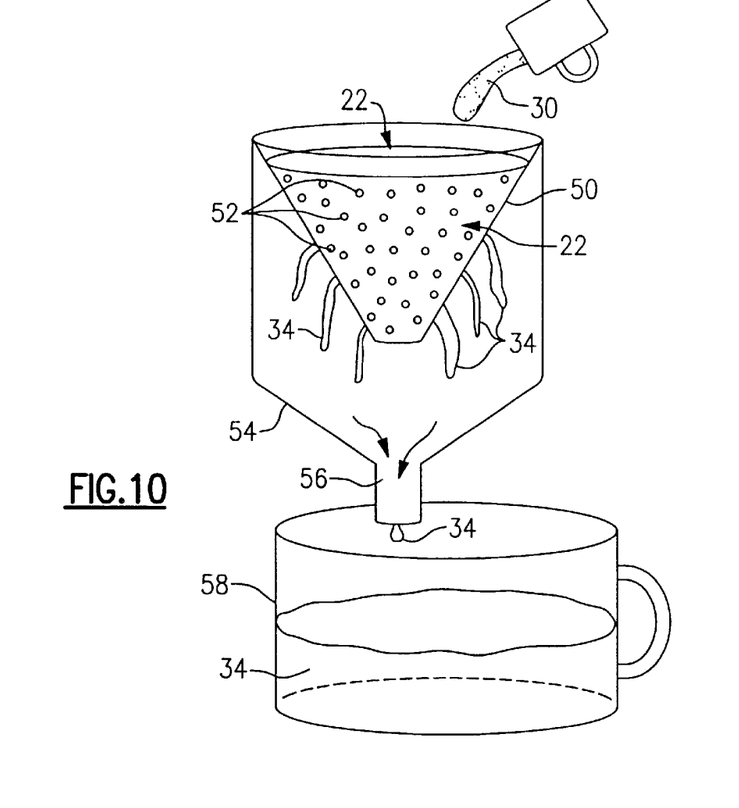
FIG. 10 is view in perspective of an aqueous extract (i.e., a caffeinated beverage) in a funnel being exposed to the polymer beads and flowing through a plurality of openings in the funnel to be collected in a second container after having had a portion of the caffeine molecules removed by the beads.

Referring now to FIG. 10, a funnel 50 includes a plurality of openings 52. The washed beads 22 are contained inside the funnel 50. The funnel 50 is made of any desired material, such as a thermo-plastic (to withstand the heat if the aqueous solution 30 is at an elevated temperature) or a metal or any synthetic material, as desired. The plurality of openings 52 may include either a plurality of holes that pass through the funnel 50 or a mesh that contains the plurality of openings 52 therein.

The aqueous solution 30 flows into the funnel 50 where it commingles with the washed beads 22.

Eventually, after the desired quantity of the caffeine molecules 12 have been removed, as was generally described hereinbefore, the aqueous solution 30 becomes the decaffeinated aqueous solution 34 and it then passes through the openings 52 and into an outer container 54 that contains a second orifice 56 through which the decaffeinated aqueous solution 34 flows out of and into a collection device 58, such as a coffee pot (or a large commercial container).

The plurality of openings 52 are small enough so as to prevent the washed beads 22 from passing through them while being large enough to permit the decaffeinated aqueous solution 34 to flow through them. By regulating the size and/or the number of the plurality of openings 52 it is possible to regulate the rate by which the decaffeinated aqueous solution 34 can pass through them and, as was described hereinabove, the efficacy of the decaffeination process can also be regulated.

For example, making the openings 52 smaller will increase resistance and accordingly, the aqueous solution 34 will be forced to commingle for a longer period of time with the washed beads 22. This will increase the efficacy of the decaffeination process. It will also lengthen the time it takes to obtain the decaffeinated aqueous solution 34 (i.e., the time it takes to obtain a brewed cup of decaffeinated coffee or tea, for example).

Conversely, making the openings 52 larger will decrease the efficacy of the decaffeination process while shortening the time to obtain a cup of decaffeinated coffee (or tea, etc.).

The funnel 50 provides a device useful to contain the washed beads 22 other than the enclosure 26. It serves as a modified type of an enclosure useful in containing the washed beads 22.

It is important to note that the use of the funnel 50 to contain the washed beads 22, as well any of the other methods and devices as herein described, may be adapted for consumer use ranging from single cup at a time usage to the brewing of as many cups at a time as desired. For example, the size of the enclosure 26 and the quantity of the washed beads 22 therein are varied accordingly. Similarly, they may each be adapted for commercial use including their use in coffee and tea houses and the like as well as their use by large coffee or tea manufacturers, for example, by those who make freeze-dried coffee or tea products. Accordingly, commercial uses will also vary the magnitude of any step herein disclosed to suit whatever the need is. And, as mentioned hereinabove, any of the devices or processes may be modified to accomplish the pressurized exposure of the aqueous solution 30 to the washed beads 22.

Figure 11:
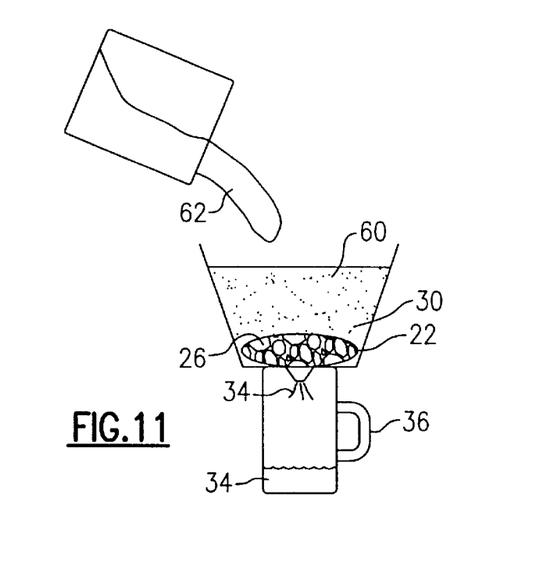
FIG. 11 is similar to the view of FIG. 5, however a ground coffee is disposed atop the polymer beads and water (instead of the aqueous extract) is being added so as to simultaneously brew and decaffeinate a beverage.

Referring now to FIG. 11, a view similar to that of FIG. 7 is shown, however disposed above the enclosure 26 containing the washed beads 22, there is a quantity of ground coffee 60. Water 62, in particular water 62 that has been heated, is being poured over the ground coffee 60 (instead of the aqueous solution 30 of FIG. 7) so as to brew a cup of coffee that contains typical concentration levels of the caffeine molecules 12 as one would expect. The brewed cup of coffee that contains the caffeine molecules 12 is an example of the aqueous solution 30 that was mentioned hereinabove.

The water 62, as it passes through the ground coffee 60, becomes the aqueous solution 30 which then flows immediately into the enclosure 26 where it commingles with the washed beads 22 so as to produce the decaffeinated aqueous solution 34 that is collected in the second container 36, ready for immediate consumption (drinking).

The enclosure 26 is disposed so as to ensure that nearly all of the water 62 and the aqueous solution 30 will pass through the enclosure 26 before it can flow into the second container 36. This helps to improve efficacy for the decaffeination process by ensuring that very nearly all of the aqueous solution 30 has been exposed to the washed beads 22.

It is important to note that the ground coffee 60 can be any type of a coffee bean or a combination of coffee beans (i.e., a blend). This allows a consumer to enjoy his or her favorite type of coffee in a decaffeinated form. This is because any preferred caffeinated coffee bean or blend can be purchased and decaffeinated by the consumer when desired, which normally would occur just prior to the time of consumption.

This solves the previous consumer problem of having only a limited choice in the selection of decaffeinated beverages by providing a method that allows the consumer to decaffeinate their own beverages, thereby making the decaffeinated choices virtually unlimited. Prior decaffeination methods precluded the general public from economically having an ability to decaffeinate their own aqueous extracts (not shown).

Obviously, any type or blend of teas may be substituted for the ground coffee 60 to permit their decaffeination as well.

It is noted that the washed beads 22 are, themselves, inert. Being essentially very small beads of plastic with diameters in the um range (depending upon the application), even if a small quantity of them should pass out of the enclosure 26 or out of the funnel 50 and combine with the decaffeinated solution 34, they would not likely cause any harm if consumed, but would instead pass through the digestive system of the consumer and be expelled normally through bodily wastes. It is also noted that either the washed beads 22 or the unwashed beads 18 may be screened (i.e., sieved) to ensure a uniform range of diameters for any particular application.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A product for decaffeinating an aqueous extract, comprising:

(a) a plurality of molecularly imprinted polymer beads; and (b) a plurality of imprints disposed on the surface of at least some of said molecularly imprinted polymer beads that correspond with at least a portion of the molecular shape of a caffeine molecule.

2. The product of claim 1 wherein said aqueous extract is a brewed cup of coffee.

3. The product of claim 1 wherein said aqueous extract is a brewed cup of a tea.

4. The product of claim 1 wherein said aqueous extract is derived from an organic substance.

5. The product of claim 1 wherein said aqueous extract is derived from a vegetable material.

6. The product of claim 1 including means for containing said plurality of molecularly imprinted polymer beads and wherein when said aqueous extract is exposed to said plurality of molecularly imprinted beads, at least some of said imprints are adapted to extract a caffeine molecule from said aqueous extract.

7. The product of claim 6 wherein said means for containing includes means for providing an enclosure that is adapted to contain said plurality of molecularly imprinted polymer beads.

8. The product of claim 7 wherein said means for providing an enclosure includes a plurality of openings, said plurality of openings generally being smaller than the diameter of said molecularly imprinted polymer beads.

9. The product of claim 7 wherein said means for providing an enclosure includes providing a plurality of openings in said enclosure, said plurality of openings generally being of a size sufficient to permit the passage of said aqueous extract through said enclosure.

10. The product of claim 7 wherein said means for providing an enclosure includes a plurality of openings formed in said enclosure, said openings generally being smaller than the diameter of said molecularly imprinted polymer beads and wherein said openings generally are of a size sufficient to permit the passage of said aqueous extract through said enclosure.

* * * * *